3,780,067
PROCESS FOR THE PREPARATION OF 4-CHLORO-N-FURFURYL - 5 - SULFAMOYL-ANTHRANILIC ACID

Haim Yellin and Eliezer Konfino, Ramat Gan, Israel, assignors to Assia Chemical Laboratories Ltd., Tel Aviv, Israel
No Drawing. Filed Apr. 30, 1971, Ser. No. 139,251
Int. Cl. C07d 5/16
U.S. Cl. 260—347.2         8 Claims

ABSTRACT OF THE DISCLOSURE

A process for the preparation of 4-chloro-N-furfuryl-5-sulfamoyl-anthranilic acid comprising reacting an alkali salt of 3-sulfamoyl-4,6-dichlorobenzoic acid, in the absence of water, with about 3 equivalents of furfurylamine at a temperature of from 120 to 140° C. and thereafter acidifying the alkali salt obtained to produce the desired compound.

---

The present invention relates to a new process for the preparation of 4-chloro-N-furfuryl-5-sulfamoyl-anthranilic acid (known as "Fursemide," "Furosemide" or "Frusemide") and hereinafter called Fursemide.

Fursemide is one of the most important diuretic and saluretic agents. It is widely used in the clinical treatment of all types of edema.

There are known various processes for the preparation of Fursemide but they are not satisfactory as they have serious drawbacks.

Thus, one process, described and claimed in German Pat. No. 1,122,541, consists in the reaction of 3-sulfamyl-4,6-dichlorobenzoic acid with a large excess of furfurylamine at a temperature above 80°. (All temperatures are indicated herein in degrees centigrades.) This process is accompanied by a considerable amount of side-reactions and polymerised by-products and the yield of the end product obtained is thus quite low (about 31% of the theory).

Another process, described and claimed in German Pat. No. 1,174,797, consists in the reaction of a 3-sulfamyl-4,6-dichlorobenzoic acid ester also with a large excess of furfurylamine and the subsequent hydrolysis of the 4-chloro-N-furfuryl-5-sulfamoyl-anthranilic acid ester obtained to Fursemide. This process requires a 6 fold excess of furfurylamine and moreover esterification and hydrolysis, which two additional chemical steps increase the cost of the process considerably. The yield of this process is about 50% of the theory.

It has now surprisingly been found that when an alkali salt of 3-sulfamyl-4,6-dichlorobenzoic acid is used as starting material instead of the ester the excess of furfurylamine required is much lower without having any adverse effect on the yield. Moreover the preparation of a salt and subsequent acidification are much simpler steps than esterification and hydrolysis and thus the costs of the new process are much lower than that of the known one.

The present invention thus consists in a process for the preparation of 4-chloro-N-furfuryl-sulfamoyl-anthranilic acid (Fursemide) wherein an alkali salt of the 3-sulfamyl-4,6-dichlorobenzoic acid is reacted in the absence of water with about 3 equivalents of furfurylamine at 120–140° and thereafter the alkali salt of the Fursemide obtained is acidified.

An alkali salt in connection with the present invention means the sodium, potassium, lithium and ammonium salt. The preferred salt is the sodium salt. The starting alkali salt may be prepared either by a separate reaction step or in situ the course of the main reaction.

The reaction may be performed by reacting the reactants without utilising any solvent. However, preferably the reaction is performed in a suitable inert solvent, this solvent should be inert to the reactants and to the end products and be able to dissolve the small amount of polymerised material obtained as by-products in the course of the reaction. As suitable solvents there may be mentioned, for example, ethylene glycol, propylene glycol, Cellosolve and dimethylsulfoxide (DMSO).

The acidification step may be performed with any suitable acid, advantageously with acetic acid.

The product obtained at the end of the process is quite pure. However, if desired, it may be further purified by methods known per se, e.g. by recrystallisation from a solvent, e.g. 95% ethanol or by the re-preparation of the sodium salt of the Fursemide and re-acidification thereof.

The invention will now be illustrated by the following examples without being limited by them.

EXAMPLE 1

A 4 liters 3-necked flask, provided with stirrer, condenser and thermometer, was charged with 500 ml. of methanol and 22.1 g. of sodium metal. After the complete dissolution of the sodium, 270 g. of 3-sulfamoyl-4,6-dichlorobenzoic acid were added and methanol was distilled off on a steam bath. The remaining methanol was removed by distillation under reduced pressure (60 mm.).

291 g. of furfurylamine were then added to the reaction mixture which was thereafter heated for 4 hours to 130–5°. After the completion of the reaction the mixture was cooled to about 100°, and 3 l. of water were added. The aqueous solution obtained was heated to 90°, charcoal and filter cel were added and the solution was filtered hot. 450 g. of sodium chloride were added to the filtrate and the mixture was stirred at 80–90° until the sodium chloride dissolved. The solution was left overnight at room temperature until the sodium salt of Fursemide completely precipitated. The crude sodium salt was filtered off, dissolved in 2 l. of hot water and acidified with 50 ml. of acetic acid to pH 3–4. The mixture was then cooled to 10° for 2 hours, filtered and washed with water. The crude product weighed after drying 172 g., M.P. 207°. It was purified as follows:

The wet product was dissolved in 1700 ml. of 10% sodium bicarbonate by heating to 70°. The clear solution obtained was blacked with charcoal and filtered hot, and the solution was then cooled to 5–10° overnight. The sodium salt was filtered off, dissolved in 2 l. of hot water, blacked again and filtered. The filtrate, while still hot, was acidified with 50 ml. of acetic acid, cooled to 5–10° and the precipitate obtained was washed with water and dried at 80°. Yield 165 g. (yield 50%) white powder. Assay 99.8% M.P. 209°.

EXAMPLE 2

30 kg. of furfurylamine and 5 l. of Cellosolve were placed in a 180 liter stainless steel vessel. 27 kg. of 3-sulfamyl-4,6-dichlorobenzoic acid were added in portion to the mixture with stirring. The mixture was then heated to 120° and 8.4 kg. of sodium bicarbonate were added in portions, during the course of two hours. The temperature was then raised in order to distil off water, until a temperature of 130–132° had been attained. (The distillation preceded the reaction of the salt of the 3-sulfamyl-4,6-dichlorobenzoic acid, thus prepared in situ, with furfurylamine.) The distilling was then stopped and the mixture was refluxed for 4 hours. The reaction mixture was then poured into a solution of 230 l. of water containing 26 kg. of sodium chloride and 16 kg. of sodium bicarbonate previously heated to 70–80°. The combined mixtures were stirred and cooled for 4 hours, and then left to stand overnight. On the following day the mixture was first cooled to 15°, and the precipitate was then centrifuged, washed with about 25 l. of cold isopropanol until it was colourless. Yield: (sodium salt wet) 28 kg.

The sodium salt so obtained was dissolved in 160 l. of water at 80° in a 200 l. stainless steel vessel. 300 g. of Norit were added and the mixture was stirred and filtered through a filter aid. To the filtrate were added 4 l. of glacial acetic acid to precipitate the free acid. The mixture was cooled, centrifuged and the Fursemide was separated, washed with water until the washing water was neutral and then dried at 70°. Yield: 18.60 kg. (55.6% of the theory); M.P. 212–213°.

EXAMPLE 3

1.5 mole of furfurylamine and 200 ml. of DMSO were added to 0.5 mole of the sodium salt of 3-sulfamyl-4,6-dichlorobenzoic acid (prepared as described in Example 1). The solution obtained was heated to 130–140° and kept at this temperature for 4 hours. The DMSO and the excess furfurylamine were then distilled off under pressure and the residue was dissolved in water. Charcoal was added to the aqueous solution, which was then filtered and the filtrate was acidified with 25 ml. of acetic acid. The precipitate obtained was filtered off and recrystallised from 95% ethanol. Yield: 50% M.P. 206°.

EXAMPLE 4

The procedure of Example 3 was repeated but ethylene glycol was used as solvent. Yield 50%; M.P. 206° (95% ethanol).

EXAMPLE 5

The procedure of Example 3 was repeated but propylene glycol was used as solvent. Yield: 51%; M.P. 206° (95% ethanol).

We claim:
1. A process for the preparation of 4-chloro-N-furfuryl-5-sulfamoyl-anthranilic acid comprising reacting an alkali salt of 3-sulfamoyl-4,6-dichlorobenzoic acid, in the absence of water, with about 3 equivalents of furfurylamine at 120–140° C., and thereafter acidifying the resulting alkali salt to obtain substantially pure 4-chloro-N-furfuryl-5-sulfamoyl-anthranilic acid in high yield,
   said furfurylamine being present in an amount sufficient to yield substantially pure 4-chloro-N-furfuryl-5-sulfamoyl-anthranilic acid in high yield when reacted with said alkali salt of 3-sulfamoyl-4,6-dichlorobenzoic acid.
2. A process according to claim 1, wherein the starting alkali salt is prepared in situ.
3. A process according to claim 1, wherein the starting alkali salt is prepared by a separate reaction step.
4. A process according to claim 1, wherein the reaction is performed in an inert solvent.
5. A process according to claim 4, wherein the solvent is selected from the group consisting of ethylene glycol, propylene glycol, Cellosolve and dimethylsulfoxide.
6. A process according to claim 1, wherein the acidification is performed with acetic acid.
7. A process according to claim 1, wherein said alkali salt is selected from the group consisting of the sodium, potassium, or lithium salt of 3 - sulfamoyl-4,6-dichlorobenzoic acid.
8. A process according to claim 1, wherein said reaction is conducted in the absence of a solvent.

References Cited
FOREIGN PATENTS 1,122,541   1/1962   Germany.
1,174,797   7/1964   Germany.

OTHER REFERENCES

Christensen et al.: Ch. Abstracts, (1969) vol. 71, 38796t.

Avidon et al.: Ch. Abstracts (1969) vol. 71, 70922d.

DONALD G. DAUS, Primary Examiner

B. DENTZ, Assistant Examiner

UNITED STATES PATENT OFFICE
CERTIFICATE OF CORRECTION

Patent No. 3,780,067                   Dated December 18, 1973

Inventor(s)   Haim Yellin, et al

It is certified that error appears in the above-identified patent and that said Letters Patent are hereby corrected as shown below:

In The Heading:

The claim to Priority was omitted. Should be.

--May 6, 1970  Israel....................34482.

Signed and sealed this 30th day of July 1974.

(SEAL)
Attest:

McCOY M. GIBSON, JR.                C. MARSHALL DANN
Attesting Officer                   Commissioner of Patents